Patented July 30, 1929.

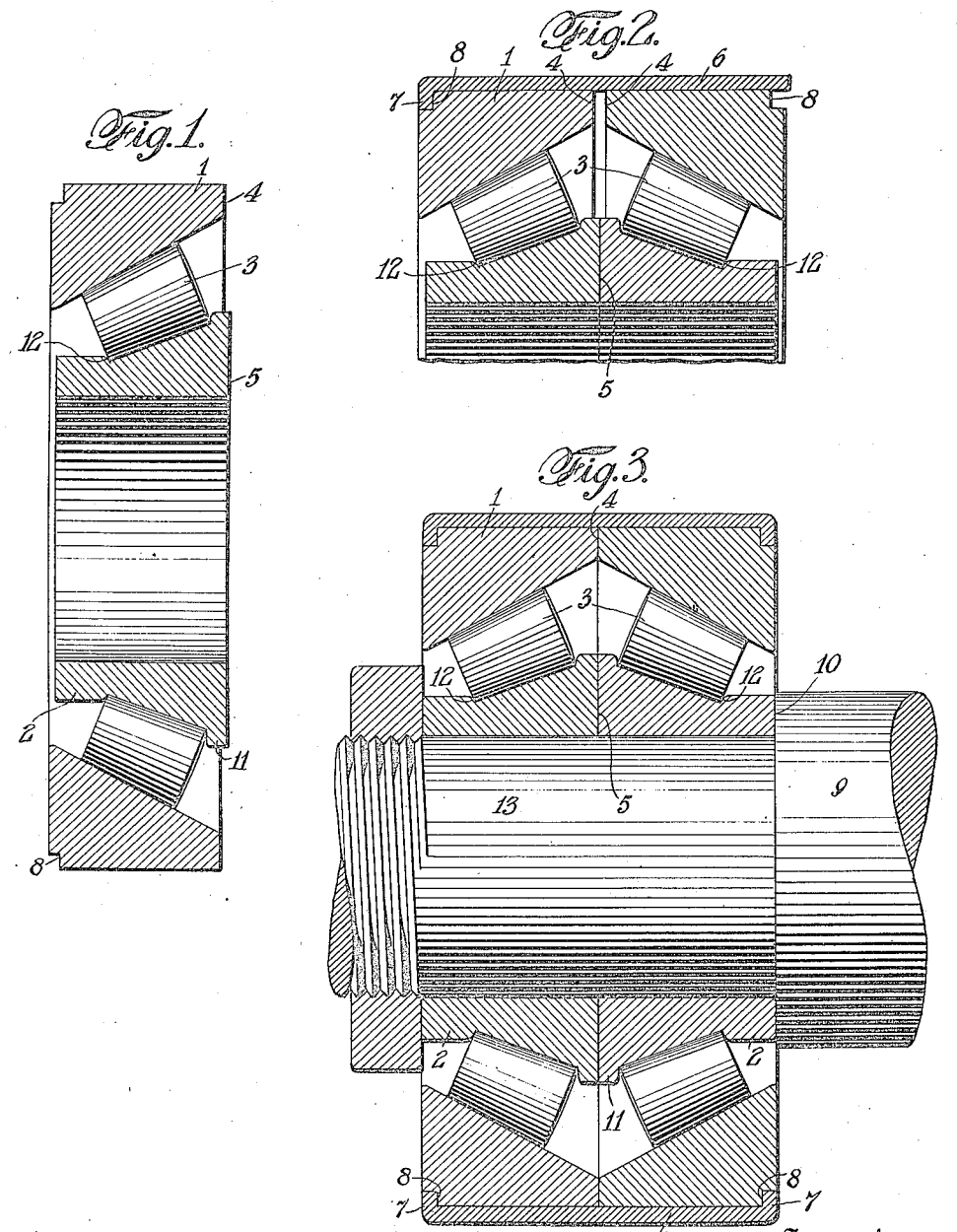

1,722,493

UNITED STATES PATENT OFFICE.

HAROLD E. BRUNNER, OF MAMARONECK, NEW YORK, ASSIGNOR TO THE SKAYEF BALL BEARING COMPANY, OF HARTFORD, CONNECTICUT, A CORPORATION OF CONNECTICUT.

DOUBLE-ROW TAPER ROLLER BEARING.

Application filed March 23, 1927. Serial No. 177,479.

This invention relates to anti-friction bearings and has for an object to provide a bearing so constructed that when two of these are mounted side by side a predetermined amount of force will be required to clamp them together, this form of construction being for the purpose of setting up predetermined internal loads in the bearings, which are used among other things, for stabilizing rotary parts.

Reference is made to the accompanying drawing in which one practicable form of my invention is illustrated, in which drawing Figure 1 illustrates in exaggerated proportions one of the bearings made in accordance with my invention.

Fig. 2 illustrates also in exaggerated proportions a sectional broken away view of a pair of bearings loosely assembled, and Fig. 3 illustrates a pair of my improved bearings in central axial section and mounted upon a broken away journal or shaft end which is shown in elevation.

Various devices and expedients have been resorted to for initially loading taper roller bearings. Most all of these have been dependent upon amounts which are measured by the relative widths of the races of a pair of bearings mounted side by side. The present invention is a development of the improvements described in my copending application for matchable bearings filed on the twenty-third day of March, 1927, bearing Serial No. 177,478.

A pair of single row roller bearings made in accordance with my invention are shown in the drawing mounted together in permanent relation forming a single self-contained handling unit. Each of these bearings comprises an outer race ring, 1, an inner race ring, 2, and a series of taper rollers, 3. The inner race ring, 2, will be assumed to be of standard S. A. E. dimensions and the outer ring, 1, to be narrower on the side, 4, than the corresponding side, 5, of the inner ring by an amount in excess of the S. A. E. tolerance. I propose so manufacturing these bearings in quantities that it will require the application of the same amount of force to bring this side of the narrower ring into the plane of the corresponding side of the wider ring, so that when any two of these bearings are indiscriminately or interchangeably placed upon a shaft the wider rings will be clamped together and the narrower rings caused to meet upon the application of predetermined pressure to the narrower rings, the side face of both inner rings and of both outer rings meeting on a common plane.

The amount removed or to be removed from the side of a ring is not measured by a certain fixed reduction in the width of the ring on that side, as compared with the width of the corresponding side of the other ring, but by the pressure or force necessary to bring the ground side of the ring to the plane of the corresponding side of the other ring. When the same side of the similar rings of a pair of bearings are reduced to such an extent that the same pressure is necessary to bring each of these ground sides to the plane of the corresponding side of the other ring of that bearing then one may be assured that when the members of this pair are matched or mated the same amount of internal pressure or tightness will be present in both bearings. Any bearing made in accordance with my invention will match and mate with any other bearing having the same size and pressure displacement factor.

The advantage of this to the user is not only ease in reassembly but the possibility of replacing one bearing of a pair with another which will function correctly.

The two bearings illustrated in the drawings are shown having the outer rings, 1, narrower at the meeting side faces, 4, which side faces are securely clamped together by means of a jacket, 6, which has flanges, 7, spun down in the suitably formed recess, 8, in the outer faces of the rings, 1.

The rings, 2, are shown mounted on the journal, 8, of a shaft, 9, and being clamped against the shoulder, 10, of such shaft by means of a suitable nut, 11.

In the illustration the inner rings of the bearings are shown provided with race grooves for the rollers or rather with flanges, 11 and 12, at their respective ends affording the guiding faces for the ends of the rollers.

Having described my invention I claim and desire to secure by Letters Patent:

1. A bearing mounting comprising two similar anti-friction bearings mounted side by side and each comprising an outer race ring, an inner race ring and a series of taper rollers uniting these, one of the rings of each bearing being narrower on the side facing the mating bearing of the pair than is the other ring of the same bearing by such an amount that the application of the same amount of force will be required to bring the respective narrower sides of the rings of both bearings into the plane of the corresponding side of the wider rings, and means for applying a predetermined axial pressure to the opposite sides of the narrower rings.

2. A bearing mounting comprising two similar taper roller bearings mounted side by side, the rings having plain radial side faces, one of the rings of each bearing being narrower on one side than the other ring of the same bearing by such an amount that the application of the same amount of force will be required to bring the narrower side of such ring into the plane of the corresponding side of the wider ring, and means for holding the said narrower sides in engagement, both inner rings and both outer rings meeting on the same plane.

3. A bearing mounting comprising two similar taper roller bearings mounted side by side, the rings having at their meeting sides plain radial faces, the outer ring of each bearing being narrower at the meeting side than the inner ring of the same bearing by such an amount that the application of the same amount of force will be required to bring the narrower side of such ring into the plane of the corresponding side of the inner ring, and means for holding such narrower sides in engagement, both inner rings and both outer rings meeting on a common plane.

4. An anti-friction bearing comprising an outer race ring, an inner race ring and a series of taper rollers uniting these, one of the said rings being narrower on one side face than is the other ring of the same bearing by such an amount that the application of a predetermined amount of force will be required to bring the narrower side of the ring into the plane of the corresponding side of the wider ring.

5. A plurality of similar taper roller bearings, the rings having on one side plain radial faces, one of the rings of each bearing being narrower on one side than the other ring of the same bearing by such an amount that the application of the same amount of force will be required to bring the narrower side of such ring into the plane of the corresponding side of the wider ring.

Signed at New York, N. Y., this 21st day of March, 1927.

HAROLD E. BRUNNER